Nov. 17, 1942.  S. SORDELLI  2,302,508
APPARATUS FOR STRETCHING FILIFORM MATERIALS
Original Filed Oct. 21, 1936  2 Sheets-Sheet 1

INVENTOR
Stefano Sordelli
BY
ATTORNEY

Nov. 17, 1942.  S. SORDELLI  2,302,508
APPARATUS FOR STRETCHING FILIFORM MATERIALS
Original Filed Oct. 21, 1936   2 Sheets-Sheet 2

INVENTOR
Stefano Sordelli
BY
Guido M. Sacerdote
ATTORNEY

Patented Nov. 17, 1942

2,302,508

UNITED STATES PATENT OFFICE 2,302,508

APPARATUS FOR STRETCHING FILIFORM MATERIALS

Stefano Sordelli, Turin, Italy; vested in the Alien Property Custodian

Original application October 21, 1936, Serial No. 106,911. Divided and this application September 30, 1939, Serial No. 297,359. In Italy November 23, 1935

9 Claims. (Cl. 28—57)

My invention relates to an apparatus substantially in the form of a winding frame, adapted to subject filiform materials, particularly artificial textile materials, to a progressive, continuous stretching action. The present application is a division of my pending application for Manufacture of artificial textiles, filed October 21, 1936, S. N. 106,911.

Devices for subjecting textile materials generally to a stretching action are known in the spinning industry, said devices generally comprising a plurality of rollers, or pairs of rollers, rotating at increasing speeds, over which the textile materials are caused to successively pass, whereby said materials undergo a certain degree of elongation.

The present invention has for its object to provide a new apparatus which is suitable for causing stretching of filiform materials of every kind, in a continuous and progressive manner. Said apparatus is substantially in the form of a winding frame having the general form of a frustum of a cone, which upon being set rotating about its axis promotes the winding of the filiform material in a series of helical turns distributed over the apparatus from its end having the minimum diameter towards the opposite end having the maximum diameter. The filiform material winds up in a continuous manner onto the apparatus and unwinds therefrom after it has travelled along the said series of turns; during this movement the material undergoes a continuous progressive stretching action, whereby it increases in length to an extent which depends upon the structural characteristics of the apparatus, chiefly the length and the degree of conicity thereof.

The apparatus according to my invention makes it possible to obtain stretching of filiform materials to an extent which is theoretically unlimited and is also very great in practice, such as 100% or more, while the apparatus itself is of relatively very small dimensions. Furthermore the stretching is produced in a characteristic manner, as compared with that effected by means of known devices comprising rollers or pairs of rollers, such as mentioned above, in that it takes place in a very great number of successive steps of minimum value, so that it may be assumed to be practically continuous and progressive.

The apparatus of this invention may be suitably employed for all industrial purposes, calling for the elongation through stretching of a filiform material whatever. The apparatus however has been more particularly designed and applied for progressively and continuously stretching artificial textile filaments, with the object of enhancing the mechanical properties of these materials.

The invention will now be particularly described with reference to a preferred embodiment thereof, designed for treating artificial textile filaments. For this purpose, the apparatus will be mounted on the spinning machine itself, between the spinning nozzle and the thread receiver (bobbin, centrifugal box, conveying ribbon or the like) thereof, in such a manner that the thread, unwinding from the apparatus, after having travelled thereon along a number of turns, goes to the receiver.

Reference will be had to the accompanying drawings, wherein:

Fig. 4 is a side view of one form of roller which may be used in place of the cylindrical rollers shown in the previous figures.

Figure 1:
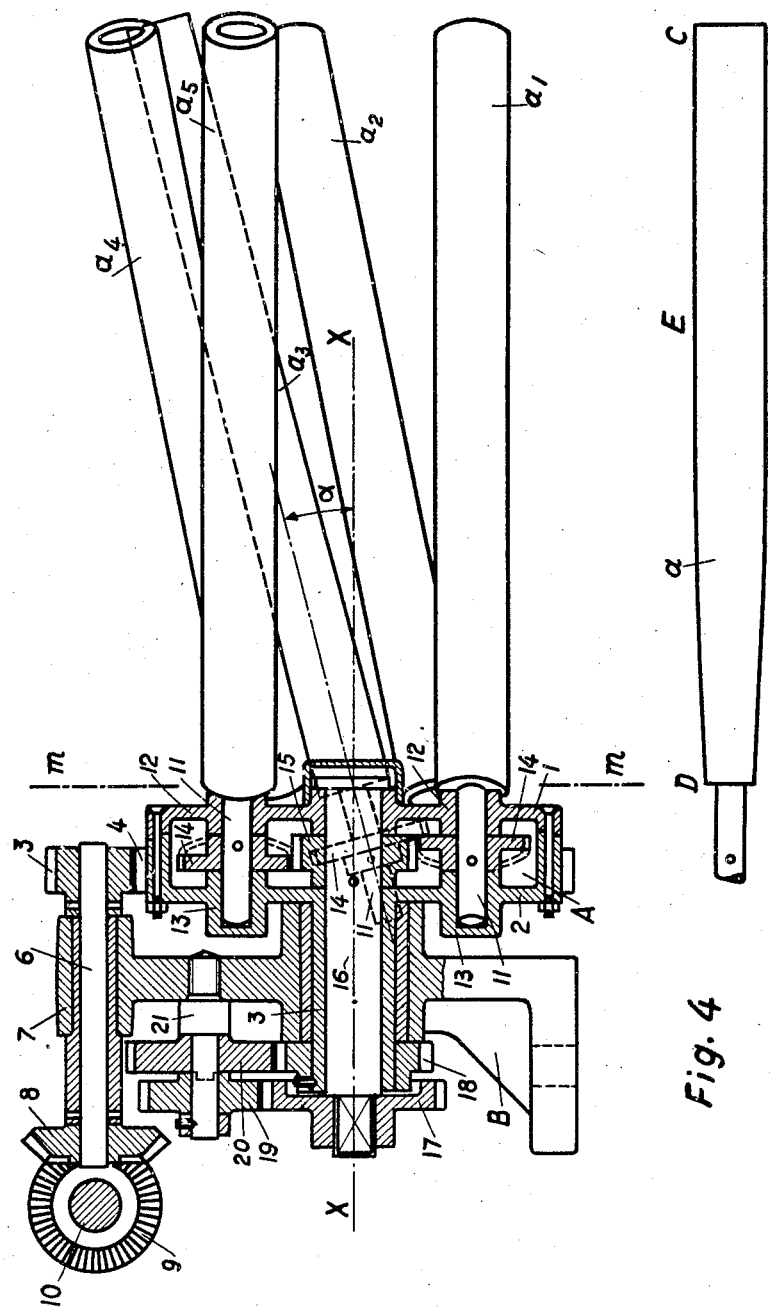
Fig. 1 is a side view of the apparatus partially in section through its longitudinal axis.
Figure 2:
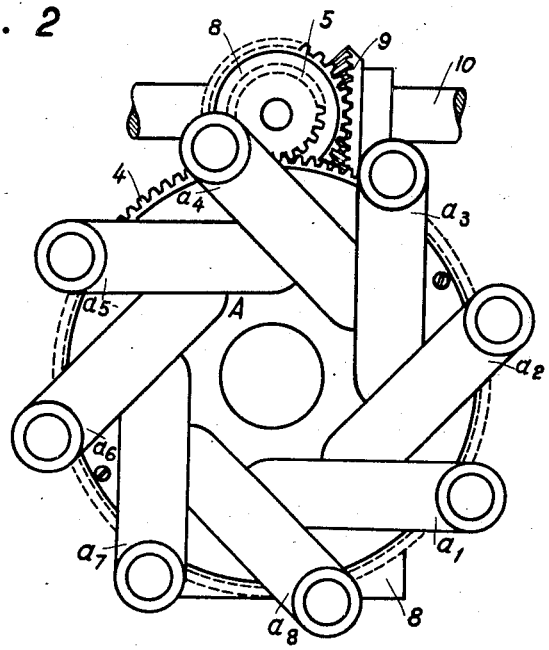
Fig. 2 is an end view along the axis of the apparatus.

The apparatus comprises a hollow drum generally indicated in the drawings by the reference character A, consisting of two parts substantially in the form of discs 1 and 2 joined together so as to form a single piece, disc 2 being formed with a long hollow spindle 3, coaxial with the drum and mounted, with the interposition of a bronze bushing, in a bored seating in a frame B. The drum A is thus free to revolve about its axis $x$—$x$, being driven in the following manner; the periphery of the drum is provided with a circumferential series of teeth 4, which mesh with a pinion 5, carried by a shaft 6 the axis of which is parallel to $x$—$x$ and is mounted in a bearing 7 provided in the frame B. The opposite end of shaft 6 carries a bevel pinion 8 which is engaged by a second bevel pinion 9, keyed on a shaft 10 the axis of which is directed at right angles to the axis $x$—$x$ of the apparatus. This shaft runs along the spinning machine parallel to the series of spinning nozzles, and may receive its movement in any conventional manner by the drive of the machine itself. The shaft 10 transmits the rotary motion to the drum A through the gears just described, and in exactly the same manner to each of the drums serving to the different spinning nozzles in the machine.

The drum A acts as a support for eight cylindrical rollers, $a_1 \ldots a_8$, having one end rotatably mounted in said drum, the axes of said rollers being at an angle to the axis $x—x$ and being spaced at equal intervals around a circumference. These axes meet a plane $m—m$ perpendicular to the axis $x—x$, at the front of the drum A, indicated in Fig. 1 by $m—m$, at points spaced 45° from one another on a circumference having its centre on the axis $x—x$; they are, however, askew with regard to the axis $x—x$, while lying on planes tangential to an imaginary cylinder having for its axis the axis $x—x$ and for its base the above mentioned circumference, and form with the generating lines of said cylinder an angle $a$.

The rollers $a_1 \ldots a_8$ are mounted so that they overhang from the drum A, by means of end pins 11 which are free to revolve in bearings 12 and 13, provided in the front part 1 and the rear part 2 of the drum, respectively. Of course the axes of these bearings are askew with respect to the axis $x—x$ in accordance with the inclination of the rollers; it should, however, be noted that the axes of the rollers $a_1$ and $a_8$ are shown in Fig. 1 in a conventional manner, for the sake of simplicity, as if they were contained in the plane of the drawing. It should further be noted that the pins 11 for the rollers $a_4$ and $a_2$, for the sake of clarity, are not shown in the drawings.

On each of the pins 11 is fixed a toothed helical wheel 14 which engages with a central gear wheel 15; this latter receives, in consequence of the rotation of the drum A, a rotary motion in the same direction, but at a lower speed, through the action of the following gearing; the gear wheel 15 is keyed to a spindle 16 which is free to rotate within the hollow spindle 3 which carries a gear wheel 17 keyed to its end projecting beyond the hollow spindle 3. This latter also carries, on its end near the gear wheel 17, a toothed wheel 18. The gear wheels 17 and 18 engage respectively with two other gear wheels 19 and 20, locked together but as a whole free to rotate on a fixed ctud 21 carried by the frame B. If the ratio of transmission between the gear wheels 17 and 18 is suitably chosen, so that it be less than 1:1, the gear wheel 15 will turn, as has been mentioned, in the same direction as the drum A, but at a lower speed.

By virtue of the engagement between the gear wheels 14 of each single roller $a$ and the central gear wheel 15, the rollers, besides being driven round as a whole with the drum A, receive each a separate rotating movement about its own axis in the same direction. The nearer the speed of the gear wheel 15 is to that of the drum A, the lower the individual speed of rotation of each separate roller about its own axis will be, and it is understood that the speed of rotation of the rollers may be suitably determined by varying the number of teeth in the gear wheels 17 ... 20. The rollers $a$ are conveniently covered with rubber or other suitable materials.

Figure 3:
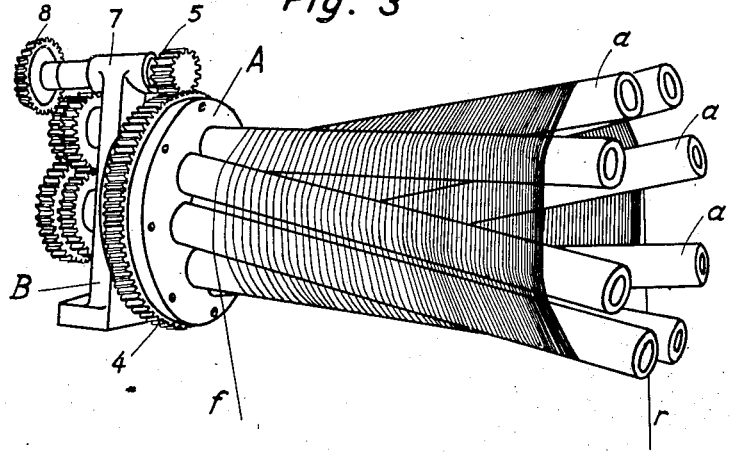
Fig. 3 is a perspective view of the apparatus showing the thread wound on it.

In the operation of the apparatus the set of rollers $a$ rotatably carried by drum A and revolving with it may be regarded as a winding frame, on which the thread coming from the spinning nozzle in the form of a bundle of filaments is caused to wind itself. It is obvious that as a result of the simple rotation of the device around the axis $x—x$ the thread would tend to wind itself according to a polygon lying in a plane at right angles to the said axis. However, owing to the individual rotation of each of the rollers $a$, it will come about that the thread, along the small arc it embraces on each roller, will be drawn by the movement of the roller along a circumference at right angles to the axis of the roller and passing through the point at which the thread makes its first contact with its surface. Owing to the obliquity of the axis of the roller with respect to the axis of rotation of the device this displacement of the thread will therefore have the effect of causing the thread to leave the plane perpendicular to the axis of the device, in a direction depending upon the obliquity of the roller. The direction of such obliquity having been suitably chosen, the turns of thread will be axially displaced starting from the side next the drum A towards the free end of the rollers. This will result in the thread assuming a generally helical direction, so that there will be formed on the system of rollers a series of turns side by side, spaced from each other a small distance and carried on the device as on a winding frame (Fig. 3). Beginning from the last turn towards the right, the thread $r$ will be led to the receiver, for example, the box of a centrifugal spinning machine, for the final winding.

The direction of the rollers $a$, diverging from the axis $x—x$ towards their free ends, is such that their envelope may be considered as roughly trunco-conical; therefore the length of a helical turn wound in a polygon on the set of rollers will increase progressively as its distance from the drum A increases.

It must be observed that each turn of thread, after it has been wound on the system of rollers in proximity of the inner ends of the roller ($f$ in Fig. 3) as a result of the rotation of the apparatus as a whole, is gradually shifted along said rollers, towards their outer end, by the effect of their individual rotation; at the same time, owing to the general rotation of the device a new turn is wound on at every revolution, beginning at $f$, and another is cast off, at $r$. In this operation the adherence between the thread and the surface of the rollers is, however, such as substantially to prevent any slipping of the turns at their points of contact, and as a consequence each turn, in passing from the point in which winding on the device begins, to the point where it is cast off, will be obliged to increase its length by a certain amount depending upon the degree of divergence between the rollers.

It is obvious that the constructional details of the apparatus may be even considerably modified or some parts may be substituted by others equivalent without going beyond the scope of the invention.

Figure 5:
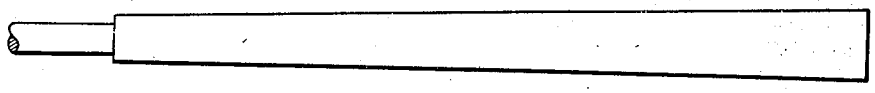
Fig. 5 is a side view of another form of roller.

The shape of the rollers, particularly, may be other than cylindrical, with a view to controlling the clearance between the successive turns of the winding, and consequently the desired rate of stretching of the filiform material, at different points along the rollers. The rollers may be conical, for instance, as shown in Fig. 5, or they may be shaped as represented in Fig. 4, wherein the outline of the portion from D to E, near the inner end of the roller, is an arc of a circle while the next portion from E to C is cylindrical, the outline of the arcuate portion of said rollers being substantially equivalent to a conical outline.

I claim:

1. An apparatus for stretching filiform materials, particularly artificial textiles, comprising a carrier member mounted to revolve about a central axis, a plurality of rollers each rotatably mounted at one end on said carrier member, at points equally spaced along a circumference concentric with the said central axis, the axes of said rollers being askew with respect to the said axis, said rollers together constituting a winding frame the envelope of which is substantially conical, the periphery of which increases from the inner or carrier end toward the outer end, means to impart a rotary motion to said carrier member, and means operatively associated therewith to simultaneously impart a rotary motion to said rollers in the same direction as and at a speed which is only a very small fraction of that of said carrier member.

2. An apparatus for stretching filiform materials, particularly artificial textiles, comprising a carrier member mounted to revolve about a central axis, a plurality of rollers each rotatably mounted at one end on said carrier member, at points equally spaced along a circumference concentric with the said central axis, the axes of said rollers being both divergent and askew with respect to the said axis, said rollers thus together constituting a substantially conical winding frame, the periphery of which increases from the inner or carrier end toward the outer end, means to impart a rotary motion to said carrier member, and means operatively associated therewith to simultaneously impart a rotary motion to said rollers in the same direction as and at a speed which is only a very small fraction of that of said carrier member.

3. An apparatus for stretching filiform materials, particularly artificial textiles, comprising a carrier member mounted to revolve about a central axis, a plurality of rollers each rotatably mounted at one end on said carrier member, at points equally spaced along a circumference concentric with the said central axis, the axes of said rollers being askew with respect to the said axis, said rollers together constituting a winding frame the envelope of which is substantially a cone, the periphery of which increases from the inner to the outer end, means to impart a rotary motion to said carrier member, and a planetary gearing to simultaneously impart a rotary motion to said rollers in the same direction as and at a speed which is only a very small fraction of that of said carrier member, said planetary gearing comprising a sun wheel coaxial with said carrier member, a planet wheel fixed on each roller, meshing with said sun wheel, and means for imparting a rotary motion to said sun wheel in the same direction as and at a speed somewhat lower than that of said carrier member.

4. An apparatus for stretching filiform materials, particularly artificial textiles, comprising a carrier member mounted to revolve about a central axis, a plurality of rollers each rotatably mounted at one end on said carrier member, at points equally spaced along a circumference concentric with the said central axis, the axes of said rollers being both divergent and askew with respect to the said axis, said rollers thus together constituting a substantially conical winding frame, the periphery of which increases from the inner to the outer end, means to impart a rotary motion to said carrier member, and a planetary gearing to simultaneously impart a rotary motion to said rollers in the same direction as and at a speed which is only a very small fraction of that of said carrier member, said planetary gearing comprising a sun wheel coaxial with said carrier member, a planet wheel fixed on each roller, meshing with said sun wheel, and means for imparting a rotary motion to said sun wheel in the same direction as and at a speed somewhat lower than that of said carrier member.

5. An apparatus for stretching filiform materials, particularly artificial textiles, comprising a carrier member mounted to revolve about a central axis, a plurality of rollers each rotatably mounted at one end on said carrier member, at points equally spaced along a circumference concentric with the said central axis, the axes of said rollers being both divergent and askew with respect to the said axis, said rollers thus together constituting a substantially conical winding frame, the periphery of which increases from the inner to the outer end, means to impart a rotary motion to said carrier member, and a planetary gearing to simultaneously impart a rotary motion to said rollers in the same direction as and at a speed which is only a very small fraction of that of said carrier member, said planetary gearing comprising a sun wheel coaxial with said carrier member, a planet wheel fixed on each roller, meshing with said sun wheel, and means interposed between said carrier member and said sun wheel transmitting movement from the former to the latter in the same direction but at a somewhat lower speed.

6. An apparatus for stretching filiform materials, particularly artificial textiles, comprising a carrier member mounted to revolve about a central axis, a plurality of cylindrical rollers each rotatably mounted at one end on said carrier member, at points equally spaced along a circumference concentric with the said central axis, the axes of said rollers being both divergent and askew with respect to the said axis, said rollers thus together constituting a substantially conical winding frame, the periphery of which increases from the inner to the outer end, means to impart a rotary motion to said carrier member, and a planetary gearing to simultaneously impart a rotary motion to said rollers in the same direction as and at a speed which is only a very small fraction of that of said carrier member, said planetary gearing comprising a sun wheel coaxial with said carrier member, a planet wheel fixed on each roller, meshing with said sun wheel, and means for imparting a rotary motion to said sun wheel in the same direction as and at a speed somewhat lower than that of said carrier member.

7. An apparatus for stretching filiform materials, particularly artificial textiles, comprising a carrier member mounted to revolve about a central axis, a plurality of rollers each rotatably mounted at one end on said carrier member, at points equally spaced along a circumference concentric with the said central axis, said rollers being at least partly of subtantially conical shape, the axes of said rollers being both divergent and askew with respect to the said axis, said rollers thus together constituting a substantially conical winding frame, the periphery of which increases from the inner to the outer end, means to impart a rotary motion to said carrier member, and a planetary gearing to simultaneously impart a rotary motion to said rollers in the same direction as and at a speed which is only a very small fraction of that of said carrier member, said planetary gearing comprising a sun wheel coaxial with said carrier member, a planet wheel fixed on each roller, meshing with said sun wheel, and means for imparting a rotary motion to said sun wheel in the same direction as and at a speed somewhat lower than that of said carrier member.

8. An apparatus for stretching filiform materials, particularly artificial textiles, comprising a carrier member mounted to revolve about a central axis, a plurality of rollers each rotatably mounted at one end on said carrier member, at points equally spaced along a circumference concentric with the said central axis, said rollers having a partly arcuated outline, the axes of said rollers being both divergent and askew with respect to the said axis, said rollers thus together constituting a substantially conical winding frame, the periphery of which increases from the inner to the outer end, means to impart a rotary motion to said carrier member, and a planetary gearing to simultaneously impart a rotary motion to said rollers in the said direction as and at a speed which is only a very small fraction of that of said carrier member, said planetary gearing comprising a sun wheel coaxial with said carrier member, a planet wheel fixed on each roller, meshing with said sun wheel, and means for imparting a rotary motion to said sun wheel in the same direction as and at a speed somewhat lower than that of said carrier member.

9. An apparatus for stretching filiform materials, particularly artificial textiles, comprising a carrier member having a rotatably mounted hollow shaft, a plurality of rollers each rotatably mounted at one end only on and overhanging from said carrier member at points equally spaced along a circumference concentric with said shaft, the axes of said rollers being both divergent and askew with respect to the axis of said shaft, said rollers thus together constituting a substantially conical winding frame, the periphery of which increases from the inner to the outer end, means to impart a rotary motion to said carrier member, a central shaft coaxial with and rotatably mounted within said hollow shaft, a planetary gearing to impart a rotary motion to said rollers in the same direction as and at a speed which is only a very small fraction of that of said carrier member, said planetary gearing comprising a sun wheel fixed on said central shaft and a planet wheel fixed on each roller, meshing with said sun wheel, and a train of gears transmitting movement from said hollow shaft to said central shaft in the same direction but at a somewhat lower speed.

STEFANO SORDELLI.